US005642014A

United States Patent [19]

Hillenius

[11] Patent Number: 5,642,014

[45] Date of Patent: Jun. 24, 1997

[54] SELF-POWERED DEVICE

[75] Inventor: Steven J. Hillenius, Summit, N.J.

[73] Assignee: Lucent Technologies Inc., Murray Hill, N.J.

[21] Appl. No.: 534,356

[22] Filed: Sep. 27, 1995

[51] Int. Cl.[6] .............................. G21H 1/06; G21D 7/00; B01J 19/00

[52] U.S. Cl. .......................... 310/303; 136/249; 136/253; 429/5; 257/429

[58] Field of Search ............................ 310/303; 136/249, 136/253; 429/5; 428/690; 257/429

[56] References Cited

U.S. PATENT DOCUMENTS

| | | | |
|---|---|---|---|
| 3,714,474 | 1/1973 | Hoff, Jr. . | |
| 3,836,798 | 9/1974 | Greatbatch . | |
| 3,934,162 | 1/1976 | Adler et al. . | |
| 3,961,209 | 6/1976 | Adler et al. . | |
| 4,010,534 | 3/1977 | Anthony et al. | 29/572 |
| 4,024,420 | 5/1977 | Anthony et al. | 310/303 |
| 5,087,533 | 2/1992 | Brown . | |
| 5,137,759 | 8/1992 | Ashley et al. . | |
| 5,240,647 | 8/1993 | Ashley et al. . | |
| 5,280,213 | 1/1994 | Day . | |
| 5,338,938 | 8/1994 | Thacker . | |
| 5,396,141 | 3/1995 | Jantz et al. | 310/303 |

OTHER PUBLICATIONS

Paul M. Brown, "Solid–State Isotopic Power Source for Computer Memory Chips," pp. 335–340, Third National Technology Transfer and Conference and Exposition, Dec. 1–3, 1992.

*Primary Examiner*—Nelson Moskowitz

[57] ABSTRACT

The invention provides a self-powered device having at least one substrate, at least one radioactive power source formed over the substrate, and integrated circuits formed over the substrate. The radioactive power source includes a first active layer of a first conductivity type, a second active layer of a second conductivity type. The first and second active layers form a depletion layer. A tritium containing layer is provided which supplies beta particles that penetrates the depletion layer generating electron-hole pairs. The electron-hole pairs are swept by the electric field in the depletion layer producing an electric current.

13 Claims, 5 Drawing Sheets

SELF-POWERED DEVICE

BACKGROUND OF THE INVENTION

1. Field of invention

This invention relates to a beta voltaic power source integrated with a substrate as a power source for integrated circuits formed on the substrate.

2. Description of related art

Radio isotopic power sources convert radiation from radioactive isotopes directly into electrical energy. Devices, such as artificial cardiac pacemakers, utilize the radio isotopic power sources for sustained long term power which allow the devices to function for many years without any other source of energy.

Tritium is an isotope of hydrogen having a half life of 12.5 years. Because tritium emits only beta particles and the intensity of the beta particles is limited, tritium is an excellent source of radiation for radio isotopic power source applications.

Beta voltaic power sources incorporate tritium together with a pn junction to directly convert the emitted beta particles into electrical energy. The beta particles emitted by the tritium is absorbed by the pn junction generating electron-hole pairs. The electron-hole pairs are separated by the built in electric field of the pn junction producing an electric current. Relatively high efficiencies are possible because each high energy beta particle produces many electron-hole pairs.

Current applications of the beta voltaic power source are in the form of a battery component. The battery is connected to a separate device such as the artificial cardiac pacemaker.

SUMMARY OF THE INVENTION

An object of the invention is to provide a self-powered device integrating a radioactive power source with integrated circuits including an least one substrate, at least one radioactive power source formed over the at least one substrate generating electric current, and integrated circuits formed over the at least one substrate. The integrated circuits are adapted to receive power from the radioactive power source.

The radioactive power source includes a first active layer having a first conductivity type formed over the substrate. An active layer is a semiconductor doped with an impurity to form either a p-type or n-type region. The substrate has a second conductivity type. A second active layer having the second conductivity type is formed over the first active layer forming a depletion region at the boundary between the first and second active layers. The interface between the first and second active layers forms either a pn or an np junction. A tritium containing layer is provided which supplies beta particles to the depletion region. A metal tritide layer is an example of the tritium containing layer.

Another embodiment of the self-powered device includes an integrated circuit substrate and at least one cap substrate. The integrated circuit substrate includes a plurality of integrated circuits and at least one power source portion. Each of the power source portion includes a first active layer having a first conductivity type formed over the integrated circuit substrate and a second active layer having the second conductivity type formed over the first active layer.

The cap substrate includes a fourth active layer having the first conductivity type formed over a bottom surface of the cap substrate. The cap substrate has the second conductivity type. A fifth active layer having the second conductivity type is formed over a top surface of the cap substrate.

The cap substrate is placed over a corresponding power source portion on the integrated circuit substrate. A tritium containing layer is placed between the cap substrate and the power source portion. The cap substrate, the power source portion and the tritium containing layer together form a beta voltaic power source. When several of the beta voltaic power sources are connected either in series and/or in parallel, a wide range of voltage and current values can be obtained.

The beta voltaic power source of the self-powered device is enhanced by trench structures formed by the first, second or fourth active layers. The trench structures allow the beta particles to be more efficiently converted into electric current.

Another object of the invention is to provide a method for producing the self-powered device. The method includes providing at least one substrate, forming at least one radioactive power source over the substrate and forming integrated circuits over the substrate. The radioactive power source is provided by forming a metal layer and diffusing tritium into the metal layer. The metal layer is comprised of metal that forms stable metal tritides with tritium.

BRIEF DESCRIPTION OF THE DRAWINGS

The invention will be described in detail with reference to the following drawings, wherein.

DETAILED DESCRIPTION OF PREFERRED EMBODIMENTS

Figure 1:
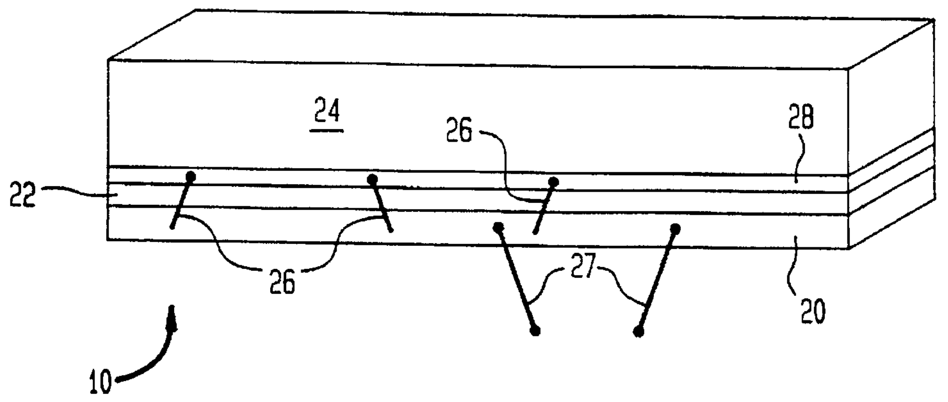
FIG. 1 is a perspective view of a self-powered device.

FIG. 1 is a perspective view of an embodiment of a self-powered device 10 comprising a p-substrate 24, an $n^+$ layer 22 formed over the bottom surface of the p-substrate 24 and a tritium containing layer formed over the $n^+$ layer 22. For this embodiment, a metal tritide layer 20 is the tritium containing layer. Alternative materials also could be used such as organic compounds or aerogels as described in U.S. Pat. No. 5,240,647. The p-substrate 24 and the $n^+$ layer 22 form a pn junction having a depletion region 28. The metal in the metal tritide layer is selected from metals which form stable tritides with tritium such as titanium, palladium, lithium, and vanadium.

Tritium is a hydrogen atom having two neutrons. During decay, the tritium atoms become helium atoms and emit beta particles. The emitted beta particles have a mean beta energy of about 5.68 KeV, a maximum energy of about 18.6 KeV, and a range of about 2 microns in silicon. When the tritium atoms of the metal tritide layer 20 decay, the helium atoms either diffuse into the atmosphere or remain trapped in the metal. The beta particles that penetrate the depletion region 28 generate electron-hole pairs. The electrons of the electron-hole pairs are swept by the pn junction electric field producing an electric current at a voltage of about 0.7 V for a silicon device.

The amount of energy that is recovered from the beta particles 26 depends on the number of electron-hole pairs that is generated and the amount of electron-hole recombination that occurs. An accurate estimate of the maximum energy available from surfaces of a metal tritide film is a function of an areal density of tritium. For titanium or lithium tritides, the maximum energy flux is between about 1.3–2.8 $\mu W/cm^2$ for each surface of the metal tritide film.

At this power level, beta voltaic power sources provide a practical long term energy source for applications such as watches. A typical watch chip consumes about 0.5 μw of power. Thus, at 1.3 $\mu w/cm^2$, about 0.4 $cm^2$ of surface is required for a titanium or a lithium tritide beta voltaic power source.

While the voltage level generated by a silicon beta voltaic power source is about 0.7 V, conventional circuit voltage requirement is usually about 3.3 V. However, devices such as Dynamic threshold voltage MOSFETs (DTMOS) that function at ultra low voltages may be used. See Assaderaghi et al., IEEE 1994, IEOM 94-809, 33.1.1–33.1.4. Alternatively, multiple beta voltaic power sources can be interconnected in series and/or in parallel to generate a power source of a variety of voltage and current capabilities. In addition, DC—DC conversion techniques such as charge pumping can be used to increase voltage levels.

Figure 2:
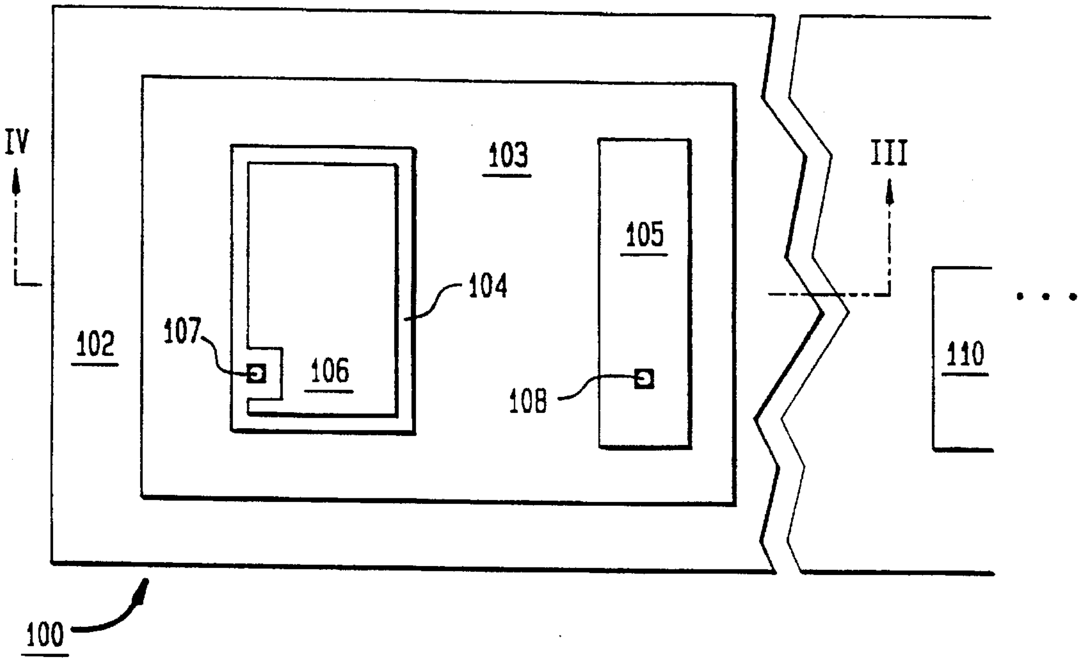
FIG. 2 is a plan view of a self-powered device having an integrated circuit on the same surface as the beta voltaic power source.

FIG. 2 shows a second embodiment of the self-powered device 100. An n layer 103 is formed over a surface of a p-substrate 102, and a $p^+$ layer 104 is formed over the n layer 103. The n layer 103 and the $p^+$ 104 form a pn junction having a depletion layer that converts the beta particles into electrical current. A metal tritide layer 106 is formed over the $p^+$ layer 104. An electrode 107 is formed over the $p^+$ layer 104 to provide an electrical contact for connection to an integrated circuit 110 as a $V_{dd}$ power supply. Ann$^+$ layer 105 is formed over the n layer 103. An electrode 108 provides a $V_{ss}$ power supply for the integrated circuit 110.

Figure 3:
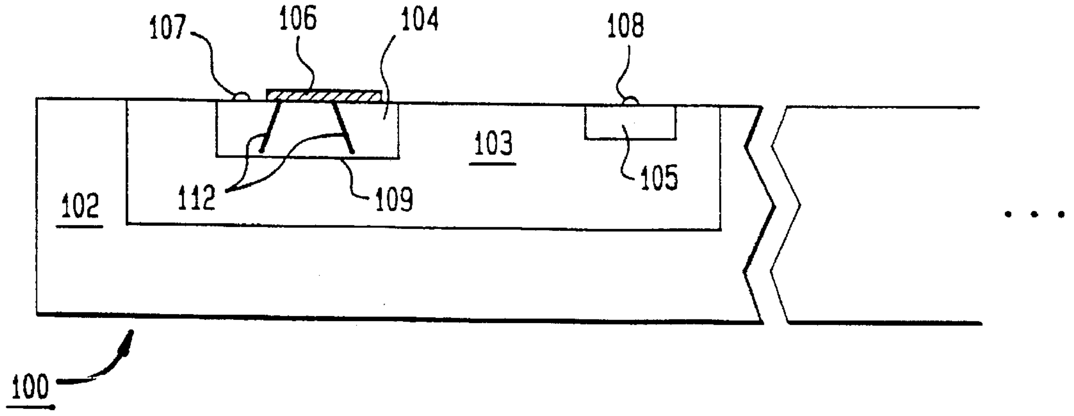
FIG. 3 is a cross-sectional view III—III of the self-powered device of FIG. 2.

FIG. 3 is a cross-sectional view of the self-powered device 100 across a line III—III. The pn junction 109 is formed by the $p^+$ layer 104 and the n layer 103. The metal tritide layer 106 emits beta particles 112 into the pn junction 109 and produce an electrical current which is supplied to the integrated circuit 110 through the electrodes 107 and 108. Since the beta voltaic power source is formed on the same p-substrate 102 as the integrated circuit 110, the beta voltaic power source structures are formed using the same process used to form the integrated circuit 110.

The metal tritide layer 106 is formed by first forming a metal layer over the $p^+$ layer 104. The metal layer is formed by standard sputtering or physical vapor deposition techniques. For metals, such as palladium, that do not form a passivating layer of oxide on the metal layer surface, the tritium could be incorporated into the metal layer after the metal layer is deposited. For metals that do form the passivating layer of oxide such as titanium, the tritium could be incorporated during or immediately after the deposition of the metal layer. Incorporating tritium into metals is described in "Tritium and Helium-3 in Metals", R. Lasser, Springer-Verlag, 1989. For this embodiment, a metal that does not form the passivating layer is used.

The surface of the p-substrate 102, except for the metal layer, is passivated. Then, the metal layer is exposed to tritium allowing the tritium atoms to diffuse into the metal layer to form the required metal tritide layer 106. This procedure permits the formation of the complete self-powered device without unnecessarily exposing the manufacturing environment with beta radiation.

Figure 4A:
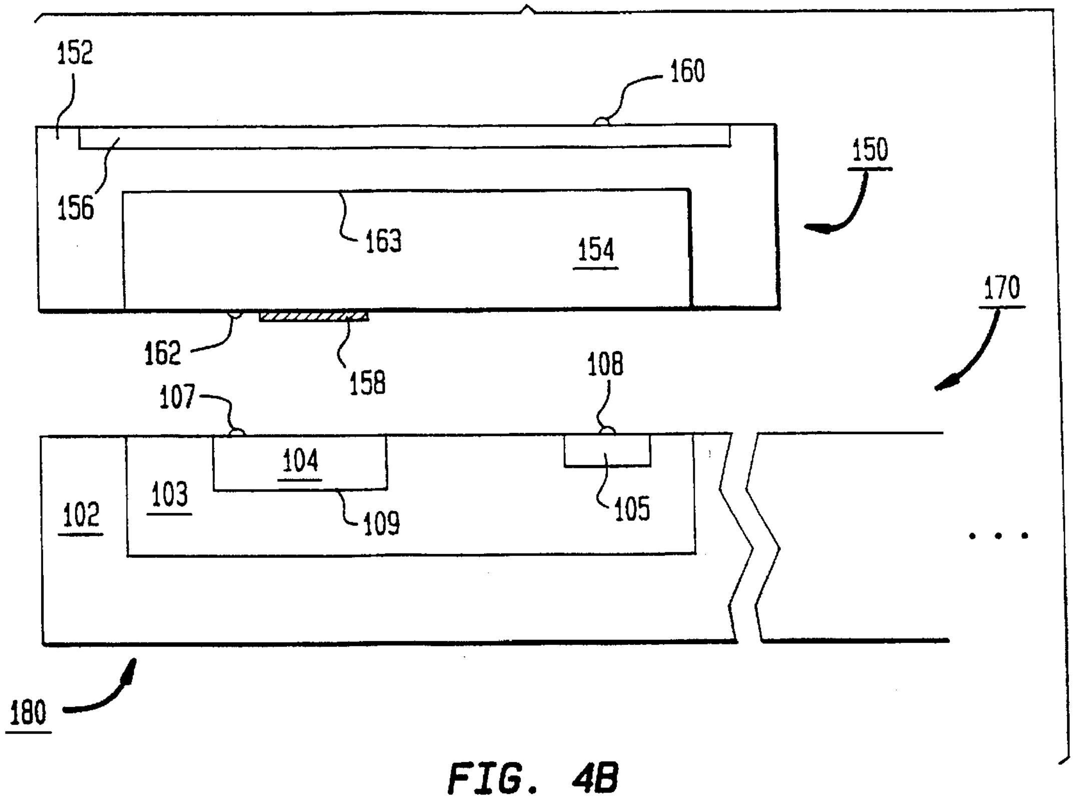
FIG. 4A is a cross-sectional view of a self-powered device having an integrated circuit portion and a radioactive cap portion.

FIG. 4A is another embodiment of a self-powered device 170 comprising an integrated circuit portion 180 and a radioactive cap portion 150. The integrated circuit portion 180 is substantially similar to the self-powered device 100 shown in FIG. 3. However, the metal tritide layer 106 is not formed over the $p^+$ layer. The electrode 108 is connected to the $V_{ss}$ power supply of the integrated circuit 110 (not shown). The electrode 107, which contacts the $p^+$ layer 104, is not connected to the $V_{dd}$ power supply of the integrated circuit 110 but contacts the electrode 162 of the radioactive cap portion 150.

The radioactive cap portion 150 comprises a p-substrate 152 and an $n^+$ layer 154 formed over the bottom surface of the p-substrate 152. The $n^+$ layer 154 and the p-substrate 152 form pn junction 163. The electrode 162 is formed over the surface of the $n^+$ layer 154. A metal tritide layer 158 is formed over the surface of the $n^+$ layer 154 providing the beta particles. A $p^+$ layer 156 is formed on the top surface of the p-substrate 152. The $p^+$ layer 156 provides an electrical contact region for the $V_{dd}$ power supply connection required for the integrated circuit 110. An electrode 160 is formed over the $p^+$ layer 156 for connecting the $V_{dd}$ power supply to the integrated circuit 110.

The structural dimensions of the integrated circuit portion 180 and the radioactive cap portion 150 are coordinated so that the electrodes 107 and 162 contact each other when the radioactive cap portion 150 is placed directly above the integrated circuit portion 180. The metal tritide layer 158 is also placed so that the beta particles emitted by the tritium contained in the metal tritide layer 158 is enclosed by both the pn junction 109 of the integrated circuit portion 180 and the pn junction 162 of the radioactive cap portion 150. Since there are two pn junctions 109 and 162 and the pn junctions are connected in series by connecting the electrodes 107 and 162 to each other, the total voltage generated by the two beta voltaic power sources are added together generating about a 1.4 V power source. Thus, this embodiment provides twice the voltage available from only one beta voltaic power source.

Figure 4B:
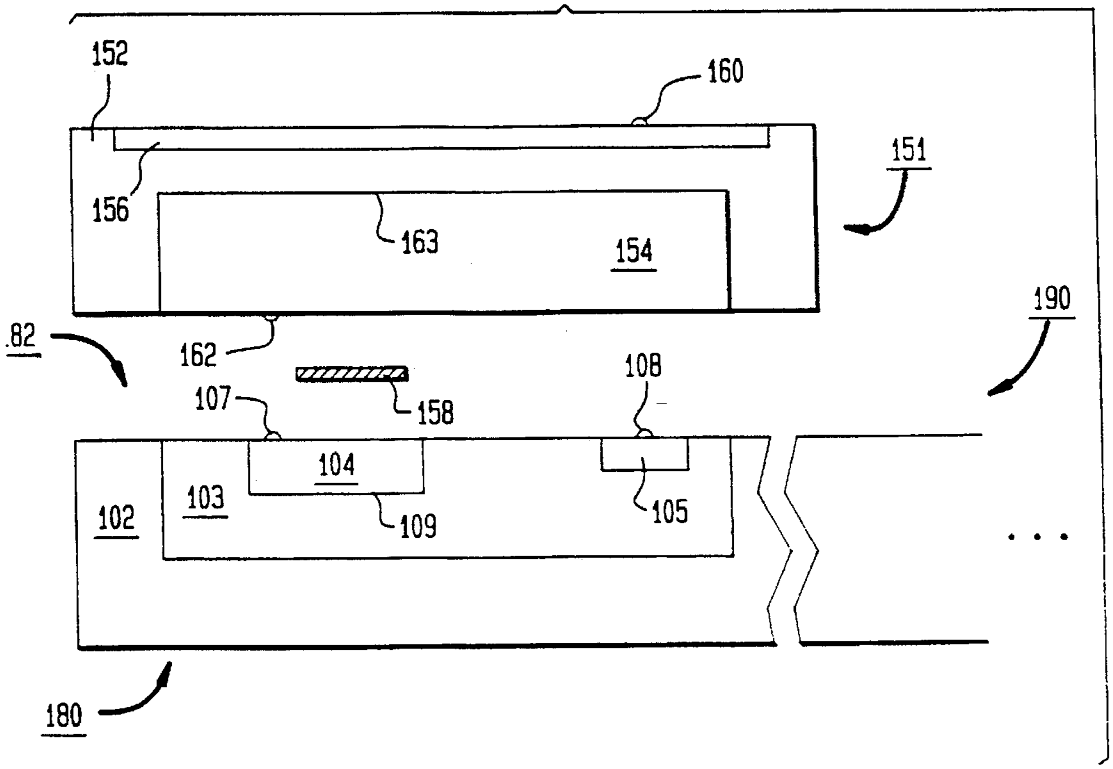
FIG. 4B is an alternative embodiment of the self-powered device of FIG. 4*a;*

FIG. 4B shows a self-powered device 190 substantially similar to the self-powered device 170 with the exception that the metal tritide layer 159 is not formed directly over the surface of the $n^+$ layer 154 of a cap portion 151. The metal tritide layer 159 is placed between the integrated circuit portion 180 and the cap portion 151. The metal tritide layer 159 may be a film that is manufactured separately from the integrated circuit portion 180 and the cap portion 151.

By using a separate metal tritide layer 159, this embodiment further controls the radioactive exposure of the manufacturing environment and permits the integrated circuit processing to be accomplished without any exposure to radioactivity. After the required processing for the integrated circuit portion 180 and the cap portion 151, the metal tritide layer 159 is put in place during final assembly by placing the cap portion 151 over the integrated circuit portion 180 and enclosing the metal tritide layer 159 in-between.

The n layer 103, the $p^+$ layer 104, the $n^+$ layer 105, and electrodes 107 and 108 form a power supply portion 182. A plurality of power supply portions 182 can be formed over the p-substrate 102. When a corresponding plurality of cap portions 151 are placed above the plurality of power supply portions 182 and a metal tritide layer 159 is placed between each corresponding pair of power supply portion 182 and cap portion 151, a plurality of beta voltaic power supplies are formed. The plurality of beta voltaic power supplies can be interconnected in series and/or in parallel to obtain voltage levels in increments of about 1.4 V and current levels limited only by the amount of surface area available on the p-substrate 102.

Figure 5A:
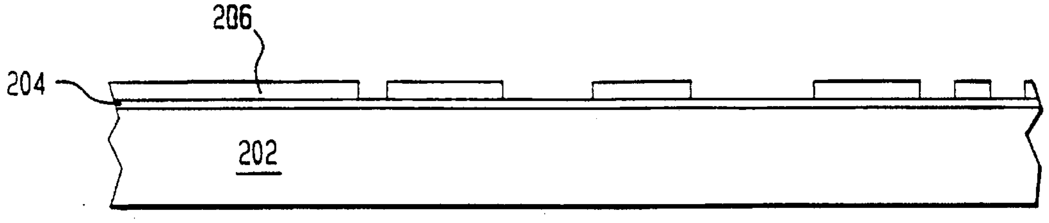
FIG. 5A–E is a process for forming a self-powered silicon device.
Figure 5B:
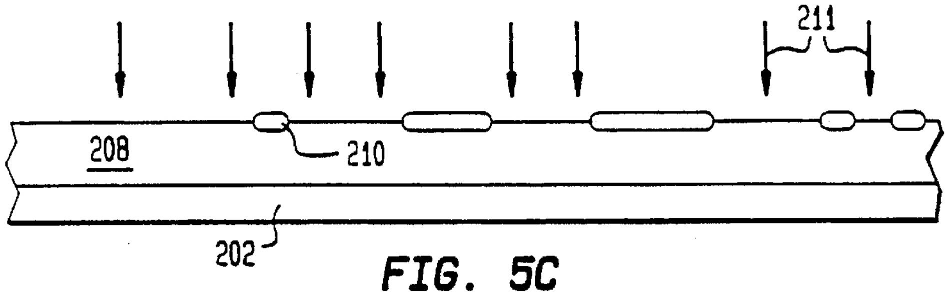

FIGS. 5A–E is a process for manufacturing the self-powered device 100 shown in FIG. 3 using silicon. In FIG. 5A a thin oxide layer 204 is formed on a surface of a p-substrate 202. A silicon nitride layer 206 is formed over the thin oxide layer 204 and patterned so that field oxide portions 210 are formed on the surface of the p-substrate 202.

Figure 5C:
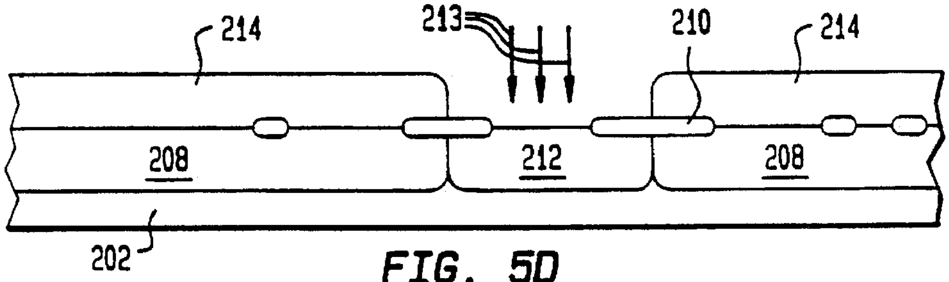

After the field oxide portions 210 are formed, the silicon nitride and thin oxide layers 206 and 204, respectively, are removed and the p-substrate 202 is blanket implanted with phosphorous 211 to form lightly doped n layer 208 on the surface of the p-substrate 202. The surface of the p-substrate 202 is then patterned with photoresist 214 and implanted with boron 213 to form a p-tub region 212 as shown in FIG. 5C.

Figure 5D:
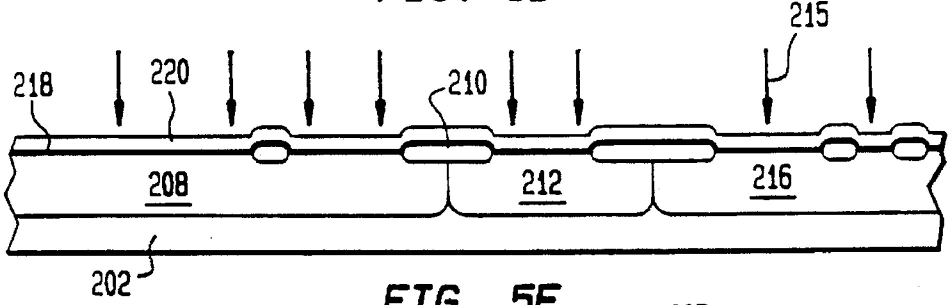
Figure 5E:
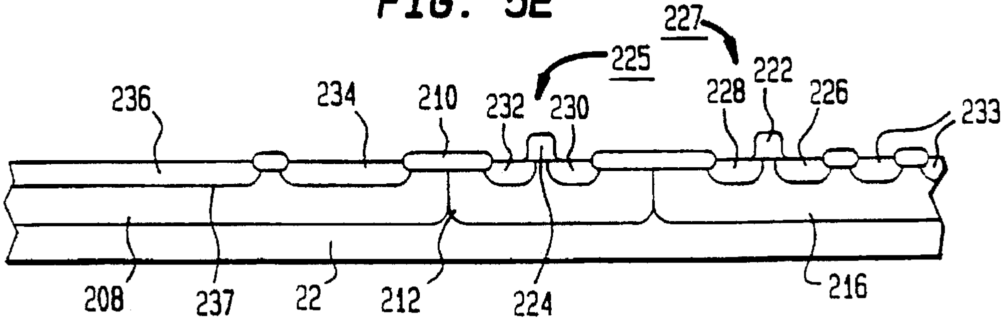

After forming the p-tub region 212, the photoresist layer 214 is removed and similar photoresist and implant steps are applied to form the $n^+$ region 216 as shown in FIG. 5D. After the ion implant steps, the surface of the p-substrate 202 contain the lightly doped n region 208, the p-tub region 212 and the $n^+$ region 216. Then, a thin oxide layer 218 is formed over the substrate and a polysilicon layer 220 is formed over the thin oxide layer 218. A phosphorous implant 215 is applied to dope the polysilicon layer 220. After the phosphorous implant step, the polysilicon layer 220 and the thin oxide layer 218 is patterned and etched to form transistor gates 224 and 222 for transistors 225 and 227, respectively.

After the formation of the transistor gates 222 and 224, the surface of the p-substrate 202 is patterned with photoresist and ion-implanted with n-type dopant to form n-channel transistor source and drain regions 232 and 230, respectively, and also ion-implanted with p-type dopant to form p-channel transistor source and drain regions 226 and 228. Further, $n^+$ region 234 is implanted for the beta voltaic power source contact and the $p^+$ region 236 is implanted to form the beta voltaic power source pn junction 237.

Figure 6A:
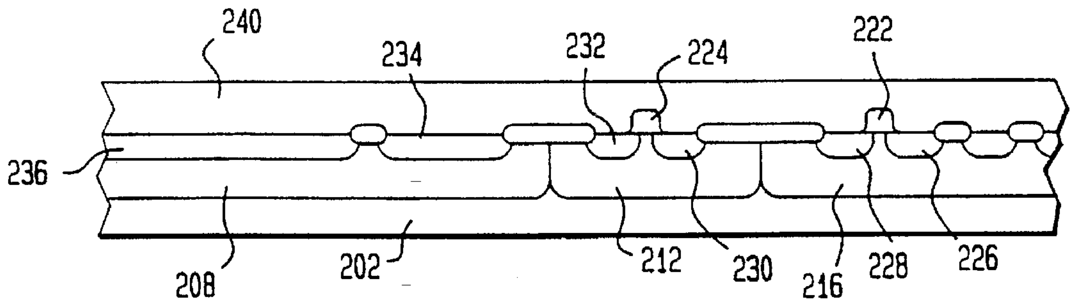
FIG. 6A–D is a process for forming the electrodes for the self-powered silicon device of FIG. 5E.
Figure 6B:
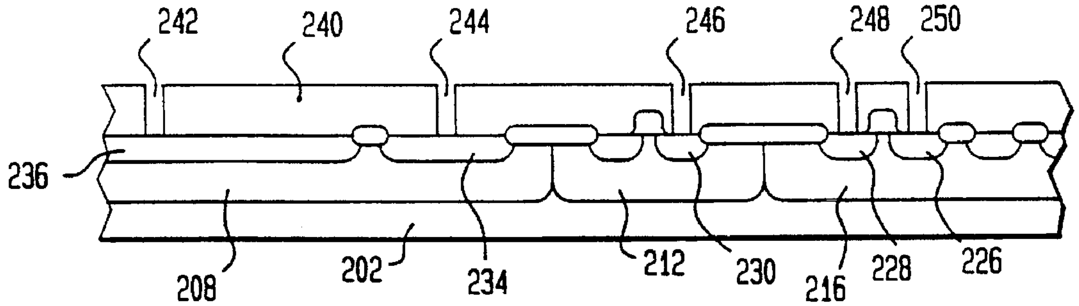

In FIG. 6A, a silicon dioxide passivation layer 240 is formed over the surface of the p-substrate 202. The passivation layer 240 is patterned to form via holes 242, 244, 246, 248 and 250. Electrodes 252, 254, 256 and 258 are formed over the respective via holes. Electrode 256 connects the drain of the n-channel transistor 225 together with the drain of the p-channel transistor 227 to form a basic CMOS configuration. Electrode 258 is shown as a typical connection to the source of the p-channel transistor 227 and is connected to the $V_{dd}$ power supply (not shown). Electrode 252 contacts the $p^+$ region 236 and is the $V_{dd}$ power supply terminal. The electrode 254 contacts the $n^+$ region 234 and is the $V_{ss}$ power supply terminal.

Figure 6C:
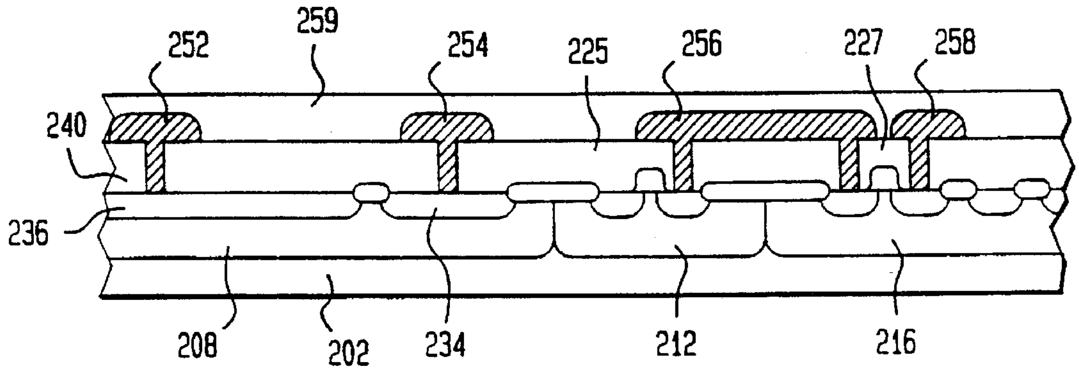
Figure 6D:
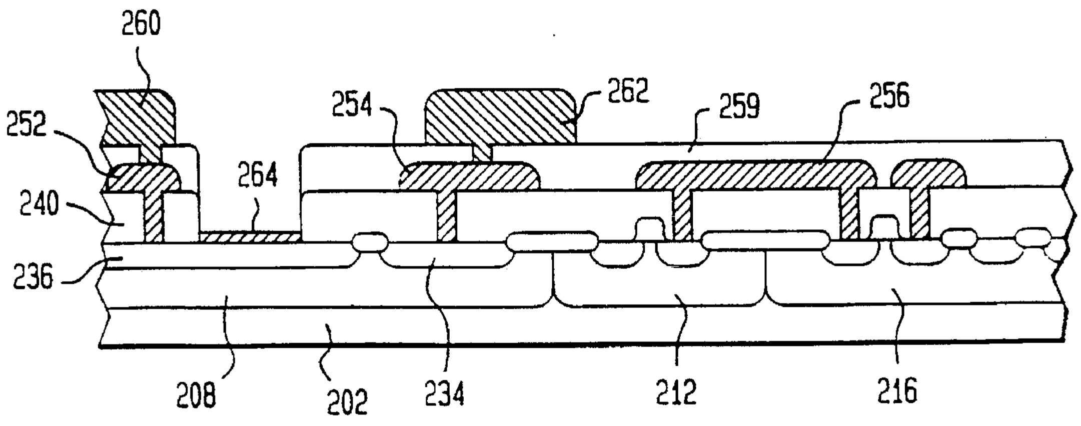

In FIG. 6C, after the electrodes 252, 254, 256 and 258 are formed, another silicon dioxide passivation layer 259 is formed over the p-substrate 202. The passivation layer 259 is patterned and etched to expose the electrodes 252 and 254 as well as the $p^+$ region 236. Electrodes 260 and 262 are formed to contact the electrodes 252 and 254, respectively, and supplies the $V_{dd}$ and $V_{ss}$ to the integrated circuits, such as transistors 225 and 227. A metal tritide layer 264 is formed above the $p^+$ layer region 236 to supply the radioactive beta particles, as shown in FIG. 6D.

Figure 7:
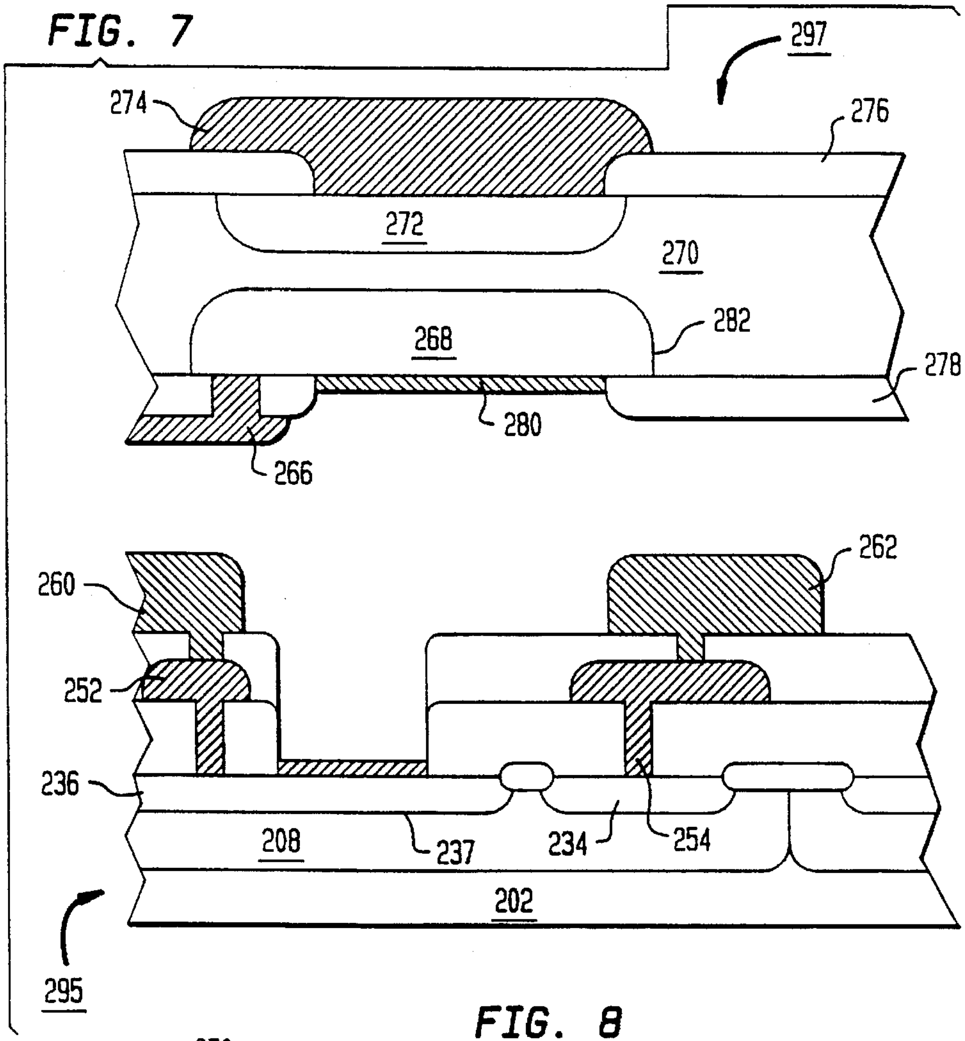
FIG. 7 is an expanded view of an integrated circuit portion and a radioactive cap portion.

FIG. 7 shows an integrated circuit portion 295 and a radioactive cap portion 297. The integrated circuit portion 295 has a structure substantially similar to the structure shown in FIG. 6D but without the metal tritide layer 264. The radioactive cap portion 297 comprises a p-substrate 270 having $n^+$ portion 268 and $p^+$ portion 272. An electrode 266 is formed over a passivation layer 278 to contact the $n^+$ portion 268. An electrode 274 is formed over the passivation layer 276 to contact the $p^+$ portion 272.

When the radioactive cap portion 297 is placed immediately above the integrated circuit portion 295, the electrodes 260 and 266 contact each other so that the integrated circuit portion 295 and the radioactive cap portion 297 form one beta voltaic power source supplying about 1.4 V to the integrated circuit 110 (not shown) which is also formed on the p-substrate 202. The electrode 262 is the $V_{ss}$ power supply terminal and the electrode 274 is the $V_{dd}$ power supply terminal for the integrated circuit 110.

A metal tritide layer 280 is formed over the $n^+$ surface of the radioactive cap portion 297. When the radioactive cap portion 297 is placed above the integrated circuit portion 295, the beta particles from the metal tritide layer 280 penetrates the pn junctions 237 and 282 of the integrated circuit portion 295 and radioactive cap portion 297.

In FIG. 1, beta particles 27 do not penetrate the depletion region 28 and thus the energy of the beta particles 27 is lost. Thus, the energy conversion efficiency from the energy contained in a total amount of emitted beta particles 26 and 27 to electrical energy is reduced.

Figure 8:
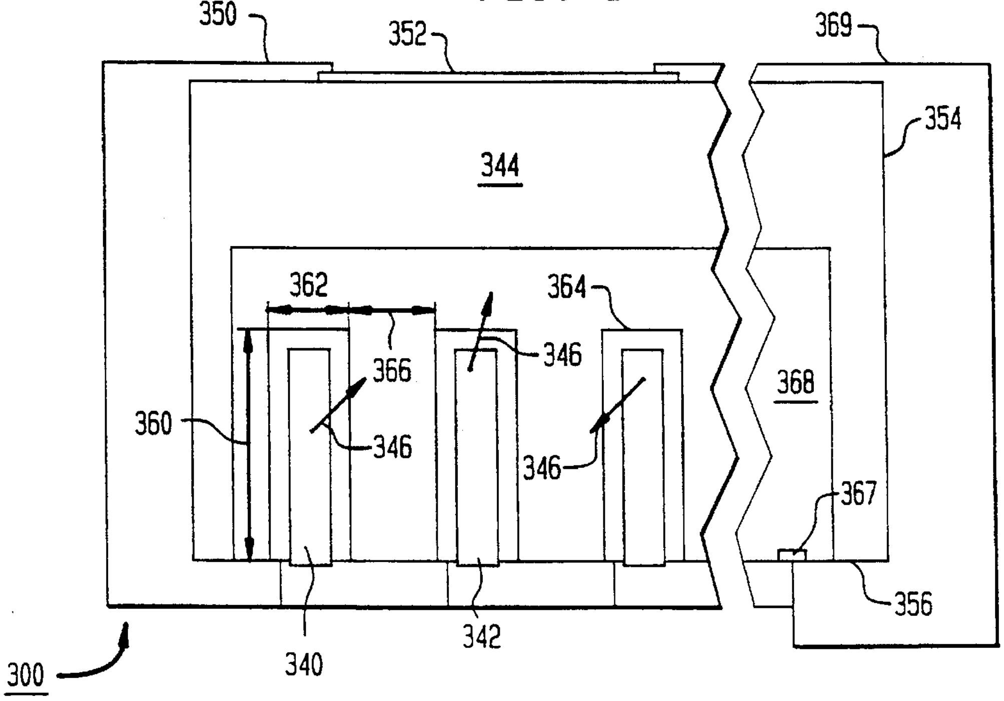
FIG. 8 is a cross-sectional view of a beta voltaic power source having trench structures.

In FIG. 8, the energy conversion efficiency is improved by embedding metal tritides in substrate trenches 364. An integrated circuit 352 is formed on a top surface 354 of a substrate 344. An n region 368 is formed over the bottom surface 356 of the substrate 344. Trenches 364 are etched into the n region 368. The depth 360 of the trenches 364 is about 10 microns and the width 362 of the trenches 364 is about 1 micron. The space 366 between the trenches 364 is about 2 microns. An $p^+$ layer 342 is formed over the surface of the trenches 364. Metal tritides 340 are formed in the trenches 364 over the surface of the $p^+$ layer 342 to complete the beta voltaic power supply. The trench dimensions are selected to increase trench density. Of course, other dimensions are possible without affecting the invention.

All the $p^+$ layers 342 are electrically connected together forming a $V_{dd}$ power supply terminal 350 connected to the integrated circuit 352. An $n^+$ layer 367 is formed over the n region 368 to provide the $V_{ss}$ contact. The $n^+$ layer is connected externally to the integrated circuit 352 through a $V_{ss}$ power supply terminal 369 for the $V_{ss}$ power supply. Accordingly, the beta voltaic cells provide continuous power to the integrated circuit 352.

Placing the metal tritides 340 in the trenches 364 surrounds the metal tritides 340 with a depletion layer. The beta particle penetration of the depletion region is increased by about a factor of 10 over the embodiment shown in FIG. 1.

The trench structure can also be used in embodiments shown in FIG. 3 and FIG. 4A. Instead of forming a planar pn junctions 109 and 162, a trench structure is formed to increase the energy conversion efficiency. For the embodiment shown in FIG. 4A, the metal tritide layer is formed in both the radioactive cap portion 150 and the integrated circuit portion 180.

While this invention has been described in conjunction with specific embodiments thereof, it is evident that many alternatives, modification and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A radio isotopic power source, comprising:

a first arrangement of semiconductor materials including a first N+ portion having a first N+ surface area, a first P– portion in contact with said first N+ portion to form a first PN junction and a first P+ portion in contact with said first P– portion;

a second arrangement of semiconductor materials including a second P+ portion having a P+ surface area that is electrically connected to the first N+ surface area, a second N+ portion having a second N+ surface area, an N portion in contact with said second P+ portion to form a second PN junction and with said second N+ portion and a second P– portion in contact with said second N portion; and a radioactive element disposed in a vicinity of said first N+ surface area and said P+ surface area.

2. A radio isotopic power source according to claim 1, wherein said radioactive element has a pair of opposite radioactive surfaces defining a thickness therebetween whereby one of said radioactive surfaces contacts said first N+ surface area and the other of said radioactive surfaces contacts said P+ surface area.

3. A radio isotopic power source according to claim 2, wherein said first N+ surface area and said second P+ surface area envelope said radioactive element.

4. A radio isotopic power source according to claim 1, wherein said first and second arrangements of semiconductor materials are one of releasably connected to each other and integrally connected together to form a unitary construction.

5. A radio isotopic power source according to claim 1, wherein said first N+ portion is embedded into said first P– portion and wherein said second P+ portion is embedded into said second N portion.

6. A radio isotopic power source according to claim 5, wherein said second N+ portion has a second N+ surface area and wherein said second N+ portion is embedded into said N portion.

7. A radio isotopic power source according to claim 6, wherein said first P+ portion is embedded into said P– portion and wherein said N portion is embedded into said second P– portion.

8. A radio isotopic power source according to claim 1, further comprising an N+ electrode connected to said first N+ portion and a P+ electrode connected to said second P+ portion.

9. A radio isotopic power source according to claim 1, further comprising a first electrode connected to said first P+ portion and a second electrode connected to said second N+ portion.

10. A radio isotopic power source according to claim 1, wherein at least one of said first and second arrangements of semiconductor materials is a cap.

11. A radio isotopic power source according to claim 1, wherein at least one of said first and second arrangements of semiconductor materials is an integrated circuit.

12. A radio isotopic power source according to claim 1, wherein a voltage potential produced by the power source is approximately 1.4 volts.

13. A radio isotopic power source, comprising:

a first arrangement of semiconductor materials including a first P+ portion having a first P+ surface area, a first N– portion in contact with said first P+ portion to form a first PN junction and a first N+ portion in contact with said first N– portion;

a second arrangement of semiconductor materials including a second N+ portion having an N+ surface area that is electrically connected to the first P+ surface area, a second P+ portion having a second P+ surface area, a P portion in contact with said second N+ portion to form a second PN junction and with said second P+ portion and a second N– portion in contact with said second P portion; and a radioactive element disposed in a vicinity of said first P+ surface area and said N+ surface area.

* * * * *